Dec. 22, 1964  J. R. PATMORE ETAL  3,162,274
SERVO-MOTOR DAMPING ASSEMBLY
Filed Oct. 30, 1962  2 Sheets-Sheet 2
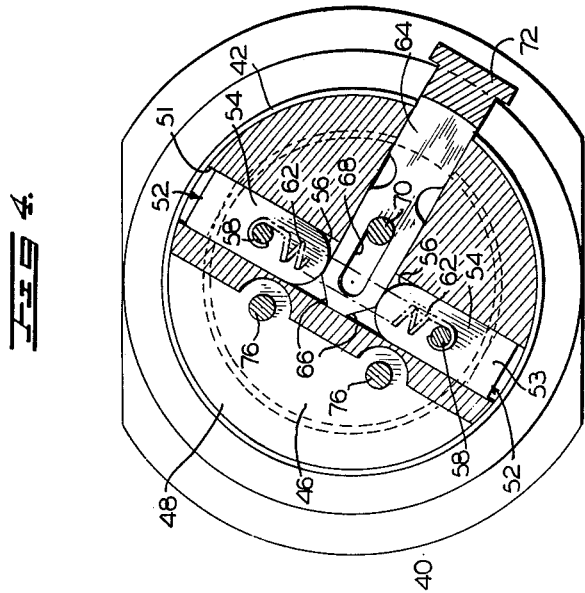
INVENTORS
JAMES R. PATMORE
HARRY A WILLIAMSON
BY  E. A. Petters
ATTORNEY

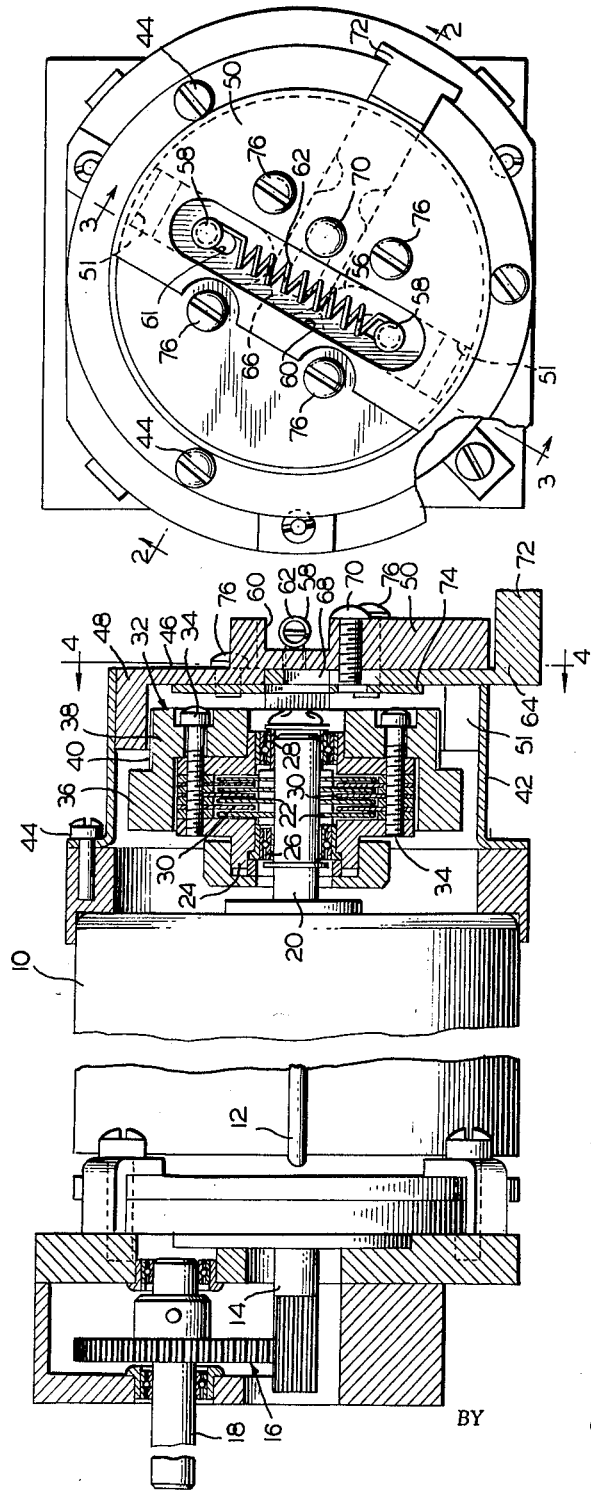

3,162,274
SERVO-MOTOR DAMPING ASSEMBLY

James R. Patmore, Neptune, and Harry A. Williamson, Red Bank, N.J., assignors to Electronic Associates Inc., Long Branch, N.J., a corporation of New Jersey
Filed Oct. 30, 1962, Ser. No. 234,186
10 Claims. (Cl. 188—90)

This invention relates to a servo-motor and in particular is directed to a small servo-motor fitted with a damping element for developing a variable damping factor.

Servo-motors are widely used in a variety of applications and various means are known for stabilizing servo mechanisms an dtake a variety of different forms. The form of stabilizing means may be purely electrical in nature, such as the well known lead network; or it may be purely mechanical in nature, such as the well known friction damper; or it may be a combination of mechanical and electrical means, such as a drag element disposed for rotation in a variable flux field. Each known type of stabilizing means has one or more desirable characteristics, but each is also possessed with a general inability either of developing a variable damping factor or of developing such a variable damping factor without significant sacrifices in cost or size.

One application where it is essential to provide variable damping is in the field of data reduction where input data is to be presented graphically in the form of either points or lines. In such application, the line data is usually presented to the typical servo systems driving the pen and arm of an X–Y recorder. The pen or stylus of the recorder is in continuous engagement with a plotting surface and a graphical representation of the input data is produced continuously. The input signals are usually continuous and of continuously varying amplitude. Point data is usually obtained from magnetic tape, punched cards, punched tapes or the like in a suitable digital form for feeding into the recorder where the information is converted into analog signals for application to the servo motors. In point plotting, the pen or stylus engages the plotting surface only after the servo motors null and accordingly the rapid and accurate nulling of the servo motor increases the amount of data which can be processed and reduced to graphical form.

The damping requirements for these two applications are quite diverse and until the present invention, a single damping element of reasonable size and cost which would permit maximum acceleration and minimum delay time for point plotting while permitting minimum velocity error for line plotting was unknown. By providing a servo motor shaft with viscous damping for point plotting and with viscous-coupled inertial damping for line plotting, a single servo motor may be utilized in a recorder for plotting a variety of diverse graphic symbols. The single servo motor is further provided with a switching operator whereby the recorder may be rapidly converted from one form of graph plotting to another form with an accompanying change to the corresponding type of damping.

An object of this invention is to combine a viscous and viscous-coupled inertial damping assembly with a servo motor.

Another object of this invention is to provide a servo motor with alternate forms of damping.

This invention has another object in that a viscous and viscous-coupled inertial damping for a servo motor is rapidly converted into simple viscous damping and vice versa.

It is a further object of this invention to provide a servo motor with an improved viscous and viscous-coupled inertial damping assembly including an inertial element operative between damping and non-damping positions by means of a latching arrangement.

The preferred embodiment of the present invention is characterized by viscous damping means in the form of a plurality of discs secured to a servo motor shaft for rotation therewith and cooperating in interface relationship with a like plurality of discs fixed to a casing which is rotatably mounted on the shaft; all the discs are submerged in a volume of oil of suitable viscosity to form a fluid couple whereby an inertial element fixed to the exterior of the casing for rotation therewith provides the servo motor shaft with viscous coupled inertial damping. A latching device is operated to prevent the rotation of the inertial element and the casing so that the servo motor shaft may be operated with only viscous damping.

Other objects and advantages of the present invention will become apparent from the following description of the preferred embodiment of the invention taken in connection with the accompanying drawing, wherein:

FIG. 1 is an end view of a servo motor embodying the invention;

FIG. 2 is a partial section view, taken substantially along the line 2—2 of FIG. 1, and including the end latching device;

FIG. 3 is a partial section view taken along the line 3—3 of FIG. 1; and

FIG. 4 is a section view along the line 4—4 of FIG. 2.

Referring now to FIG. 2, the preferred embodiment of the present invention includes a servo motor 10 with the usual rotatable shaft 12 which includes an output shaft end 14. Suitable gearing 16 couples the output shaft end 14 to a driven element 18 that is part of the pen arm and stylus assembly of the graphic recorder (not shown). The shaft 12 also includes an opposite shaft end 20 to which a combined viscous and inertial damping assembly is attached.

A plurality of disc elements 22 are secured to the shaft 20 in axial spaced relation by any suitable means whereby the discs 22 and shaft 20 are rotated as a unit. A casing 24 surrounds the discs 22 and is mounted on shaft 20 by means of annular bearing seals 26–28 disposed on opposite ends of the shaft discs 22 to permit rotation of the rotation of the casing 24 relative to the shaft 20. A second plurality of disc elements 30 are axially spaced and at their outer peripheries are fixed to the rotatable casing 24. The discs 30 extend into the spaces between the discs 22 and a liquid suitably viscous is contained with the casing 24; the liquid cooperates with the interfaces of the discs 22 and 30 to form a fluid coupling in which rotation of the discs 22 causes rotation of the discs 30.

A cup-shaped inertial element 32 of a desired mass is secured to the exterior of casing 24 as by bolts 34 extending through the bottom wall of inertial element 32 and being threaded through the casing 24. As is apparent from FIG. 1, the bolts 34 also provide the means for securing the discs 30 to the casing 24 so that the inertial element 32, discs 30, and casing 24 rotate as a unit. The cup-shaped inertial element 32 comprises an outer portion 36, which substantially surrounds the outer periphery of casing 24, and a bottom wall portion 38 which engages the axial end wall of the casing 24. The annular periphery 40 of the bottom wall portion 38 has an outer diameter that is less than that of the outer portion 36 so as to be radially offset therefrom.

The entire damping assembly is enclosed within a circular housing 42 that is attached to the end of the servo motor 10 as by bolts 44. As is illustrated in FIG. 2, the open end of housing 42 is closed by a plate 46 and any suitable fastening means. The plate 46 includes an annular extension 48 disposed inwardly of the housing 42 and a substantially semicircular projection 50 disposed outwardly thereof. The extension 48 is formed with a pair of diametrically opposed slots 51, each of which slidably receives a latching element 52. Each latching element 52 is provided with an arcuate latch bar 53 juxtaposed the inertial element's periphery 40 and a perpendicular arm 54 extending radially inwardly and terminating in a semicircular abutment 56; each arm 54 has a centrally located pin 58 extending in a direction away from the latch bar 53 so as to be positioned in an elongated recess 60 formed in the plate projection 50. A coil spring 62 is disposed in the recess 60 and is mounted in tension between the two latch pins 58 whereby the two latching elements 52 are biased towards each other.

As is illustrated in FIG. 4, the latching elements 52 are forced radially outwardly by means of a latch key 64 which has a pair of bevelled surfaces 66 to cooperate with the abutment 56 in camming the latching elements outwardly against the bias of coil spring 62. A longitudinal slot 68 in the latch key 64 cooperates with a guide stop pin 70 which extends inwardly from the plate projection 50. The latch key 64 is manually moved relative to the pin 70 by a perpendicular tab 72 on its free end. The latch arms 54 and the latch key 64 slide relative to the inner surface of plate 46 and such movement is guided by a retaining plate 74 (FIG. 3) secured to the inner surface as by the four circumferentially spaced screws 76.

The following description of the sequence of operation will be directed first to the operation where the pen assembly is to plot a series of points on the graph paper of the recorder. In point plotting, the recorder pen engages the graph paper only after the servo motor nulls which is best accomplished by providing the servo motor shaft with viscous damping only.

In accordance with the present invention, viscous damping is easily obtained by operation of the latch key 64. By manually pulling on the finger grip 72, the latch key 64 slides rapidly outwardly from the axis of the assembly as viewed in FIG. 4. Outward movement of the key 64 moves its camming edges 66 from contact with the arcuate edges 56 of the latching arms 54 whereby the latching elements 52 are moved inwardly toward each other by the bias of coil spring 62. During such movement, each pin 58 of each latch arm slides in its slot 61 in the plate 46 to guide the movement of each latching arm 54. The latch bars 53 are thus biased inwardly to clamp the adjacent portions of periphery 40 and lock the inertial element 32 against rotation. Inasmuch as the casing 24 and the discs 30 are fixed to the inertial element 32, the entire inertial damping assembly is stationary even though the shaft 20 is rotating.

The data for the point plots, which may be obtained from punched cards or tape, are converted to analog signals that cause rotation of the servo motor shaft 20. When the angular velocity of the shaft 20 is reduced, the drag of the viscous fluid between the interfaces of the rotating discs 22 and the fixed discs 30 causes a viscous damping of the rotation of the shaft 20 with the result that servo motor shaft 20 is accurately and rapidly nulled. It should be noted that even if the rotation of the servo motor shaft 20 should be accompanied with inaccuracies during acceleration, deceleration or velocity, such inaccuracies are rendered immaterial by the present invention because the only important characteristic is the null position in which the point is plotted by the pen assembly.

When the latch key 64 is in the outward position, the rounded abutments 56 on the two latching elements 52 do not engage each other because their inward movement is limited by the engagement of the arcuate latch bars 53 on the inertial element surface 40. With such an arrangement, the biasing force of coil spring 62 is entirely applied to the latch bars 53 which are thus provided with a substantial clamping force so that there is no slipping between the surface 40 and the latch bars 53. This non-slipping feature is apparent since the latching assembly is manually positioned before operation of the servo motor; i.e., the inertial element 32 is locked in place and does not accelerate as the servo motor shaft 20 is increasing its angular velocity from zero in response to an input signal.

The coil spring 62 may be designed to exert a larger or smaller biasing force as required by the particular installation; e.g., a larger force would be needed for an assembly using a larger inertial mass to be damped by more than two latching elements, and a smaller force would suffice to lock a smaller inertial mass. The coil spring 62 also precludes accidental movement of the latching arms 54 by the latch key 64 since its biasing force is sufficiently large to resist a slight push on the latch key 64 as may occur by accident. Thus, the coil spring 62 in cooperation with the rounded abutment 56 and camming edges 66 functions as a detent in requiring an initial force of substantial magnitude to push the latch key 64 inward.

In line plotting, the recorder pen engages the graph paper during the pen travel in response to servo motor operation which is best accomplished by providing the servo motor shaft with combined viscous and inertial damping. The present invention facilitates a rapid conversion from a point plotting operation to a line plotting operation even though the same servo motor and recorder apparatus are used. Combined viscous and inertial damping is obtained by the simple, single operation of the latch key 64. By manually pushing on the finger grip 72, the latch key 64 slides radially inwardly towards the longitudinal axis of the assembly as viewed in FIG. 4. Such inward movement causes the camming edges 66 to cam the rounded abutments 56 outwardly whereby the latching elements 52 are moved rapidly outwardly against the bias of coil spring 62. Accordingly, the latch bars 53 are displaced from the peripheral surface 40, the inertial elemen 32 is unlocked whereby the casing 24, the discs 30 and the inertial element 32 are free to rotate as a unit.

The data for the line plotting are generally in the form of a continuous analog signal to which the servo motor must respond with an accurate and continuous operation. When the servo motor shaft 20 is rotated, the fluid coupling formed by the interfaces of the shaft discs 22 and the casing discs 30 causes the inertial member 32 to rotate with the shaft 20. However, when the angular velocity of the shaft is reduced or its direction of rotation is reversed, the drag of the viscous fluid between the interfaces of the discs 22 and 30 effects a viscous damping of the rotation of the servo motor shaft 20, and the inertia of the inertial member 32 effects an inertial damping of such shaft rotation. In the event the rotation of the servo motor shaft is accompanied by any inaccuracies during acceleration or deceleration, such inaccuracies are not material because the only important characteristic is the velocity which influences the distance of the pen travel for a particular input signal. In accordance with the present invention, the rotation of the servo motor shaft is rendered substantially free of velocity errors since the combined viscous and inertial damping assures accurate response of the servo motor shaft to the input signal.

When the latch key 64 is in the inward position as shown in FIG. 4, the rounded abutments 56 are biased into engagement with opposite edges of the latch key 64 and thus frictionally lock the latch key 64 from accidental outward movement.

The above described damping assembly constitutes a versatile device which is quickly converted to form a first or a second type of damping and which is readily adapted for other servo systems merely by changing the viscosity of the fluid and/or the number of cooperating discs 22 and 30. Inasmuch as many other changes could be made in the above construction and many apparently widely different embodiments of the present invention could be made without departing from the scope thereof, it is intended that all matter contained in the above description or shown on the accompanying drawings shall be interpreted as illustrative and not in a limiting sense.

What is claimed is:

1. In a servo-motor mechanism, the combination comprising
  a rotatable shaft, output means connected to said shaft and adapted to record data fed to a servo motor, a casing rotatably connected to said shaft and containing a volume of fluid, fluid damping means secured to said shaft and extending into said casing for viscous damping of said shaft during its rotation, and an inertial element secured to said casing for rotation therewith whereby viscous damping of said shaft is combined with inertial damping of said shaft during rotation thereof.

2. In a servo-motor mechanism for a recorder or the like, the combination comprising a rotatable shaft, output means connected to said shaft adapted to record data fed to a servo-motor, a casing rotatably mounted on said shaft and containing a volume of fluid, disc means fixed to said shaft and extending into said casing to form viscous damping means for said shaft, an inertial element secured to said casing for rotation therewith whereby the viscous damping means is combined with inertial damping means during rotation of said shaft.

3. In combination with a servo-motor having a shaft, a viscous and inertial damping assembly comprising: a plurality of discs fixedly secured to the servo-motor shaft, a casing rotatably mounted on the shaft, said casing carrying a plurality of discs interposed between pairs of the discs mounted on the shaft, the discs on the shaft and on the casing being submerged in viscous fluid contained within the casing, said discs and viscous fluid forming a fluid couple between the shaft and the casing, and an inertial member carried by the casing whereby rotation of the servo-motor shaft is dampened by the drag of the viscous fluid between the faces of the discs and the inertia of the inertial member.

4. The combination as recited in claim 3 wherein means operatively connected to the servo-motor maintains the inertial member stationary whereby the rotation of the servo-motor shaft is dampened only by the drag of the viscous fluid between the faces of the discs.

5. In a servo motor mechanism for a graphic plotter or the like, the combination comprising a rotatable shaft, a casing rotatably mounted on said shaft, viscous damping means in said casing for viscous damping of said shaft during rotation, inertial damping means operatively mounted on said casing whereby said shaft is provided with viscous-coupled inertial damping, and means movable between latching positions relative to said inertial damping means, said movable means in one latching position locking said casing against rotation whereby said shaft is provided with viscous damping, said movable means in another latching position permitting rotation of said casing whereby said shaft is provided with viscous-coupled inertial damping, and means operatively engaging said movable means for moving the same between latching positions.

6. The combination as recited in claim 5 wherein said movable means comprises clamping elements operating on said inertial damping means.

7. The combination as recited in claim 6 wherein said clamping elements are biased to the one latching position and said operatively engaging means comprises a slidable key to move said clamping elements against their bias to the other latching position.

8. In a servo-motor mechanism for a recorder or the like, the combination comprising a rotatable shaft, a casing rotatably mounted on said shaft and containing a viscous fluid, disc means fixed to said casing and being disposed in said fluid, cooperating disc means secured to said shaft and being disposed in interface relationship with the casing disc means to form viscous damping means for said shaft, an inertial element fixed to said casing for rotation therewith to form inertial damping means for said shaft, latching elements movable into engagement with said inertial element to lock the same against rotation whereby said shaft is provided with viscous damping, said latching elements being movable out of engagement with said inertial element to permit rotation thereof whereby said shaft is provided with combined viscous and inertial damping, and selector means operatively engaging said latching elements for selectively moving the same relative to said inertial element.

9. The combination as recited in claim 8 wherein spring means biases said latching elements into engagement with said inertial element, and said selector means comprises a latching key for moving said latching elements against the bias of said spring means and out of engagement with said inertial element.

10. In a servo-motor mechanism for a graphic plotter or the like, the combination comprising a shaft rotatable about a longitudinal axis, a casing rotatably mounted on said shaft and containing a viscous fluid, a plurality of discs fixed to said casing and being immersed in said fluid, a similar plurality of discs secured to said shaft and being disposed in interface relationship with the casing discs to form a fluid coupling whereby rotation of said shaft effects rotation of said casing, an inertial element fixed to said casing for rotation therewith whereby said shaft is provided with combined viscous and inertial damping, a housing enclosing said inertial element and said casing, an end plate secured to said housing and being disposed transversely to the axis of said shaft, a pair of latching elements slidably disposed on said plate on opposite sides of said axis, a latch bar on each of said latching elements disposed adjacent said inertial element, spring means mounted in tension between said latching elements and biasing said latch bars in clamping engagement with said inertial element, a latch key slidably mounted on said plate and being operable to slide said latching elements against the bias of said spring means whereby said latch bars are moved out of clamping engagement with said inertial element, and camming means operatively disposed between said latch key and said latching elements to facilitate manual operation of said latch key.

References Cited in the file of this patent
UNITED STATES PATENTS

| 2,417,282 | Wheeler | Mar. 11, 1947 |
| 2,454,980 | Sobell | Nov. 30, 1948 |
| 3,054,304 | Jursik et al. | Sept. 18, 1962 |